(12) United States Patent
Kuhley et al.

(10) Patent No.: US 9,676,312 B2
(45) Date of Patent: Jun. 13, 2017

(54) VEHICLE SEAT WITH A MODULAR FRAME

(71) Applicant: GM GLOBAL TECHNOLOGY OPERATIONS LLC, Detroit, MI (US)

(72) Inventors: Christian Kuhley, Gross-Gerau (DE); Juergen Maier, Weitersweiler (DE); Eduard Wolf, Pfungstadt (DE); Michael Hoefgen-Allmann, Riedstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/486,821

(22) Filed: Sep. 15, 2014

(65) Prior Publication Data
US 2015/0076880 A1 Mar. 19, 2015

(30) Foreign Application Priority Data

Sep. 14, 2013 (DE) ........................ 10 2013 015 357

(51) Int. Cl.
*B60N 2/68* (2006.01)
*B60N 2/02* (2006.01)
*B60N 2/48* (2006.01)
*B60N 2/70* (2006.01)

(52) U.S. Cl.
CPC ................. *B60N 2/68* (2013.01); *B60N 2/02* (2013.01); *B60N 2/4808* (2013.01); *B60N 2/682* (2013.01); *B60N 2/686* (2013.01); *B60N 2/7094* (2013.01)

(58) Field of Classification Search
CPC ........... B60N 2/68; B60N 2/686; B60N 2/682

USPC .................................................. 297/313, 338
See application file for complete search history.

(56) References Cited

U.S. PATENT DOCUMENTS

| | | | |
|---|---|---|---|
| 3,874,729 A | 4/1975 | Blodee | |
| 4,919,485 A | 4/1990 | Guichon | |
| 5,277,476 A | 1/1994 | Caldwell | |
| 5,358,308 A | 10/1994 | Judic et al. | |
| 5,630,647 A | 5/1997 | Heidmann et al. | |
| 5,651,583 A * | 7/1997 | Klingler | A47C 7/465 297/284.1 |
| 5,704,687 A * | 1/1998 | Klingler | A47C 7/465 297/284.4 |
| 5,826,946 A * | 10/1998 | Matthews | B60N 2/5816 297/216.13 |
| 5,908,220 A * | 6/1999 | Bauer | B60N 2/62 297/284.1 |

(Continued)

FOREIGN PATENT DOCUMENTS

| | | |
|---|---|---|
| DE | 69406718 T2 | 6/1998 |
| DE | 19756272 C1 | 7/1999 |

(Continued)

*Primary Examiner* — David R Dunn
*Assistant Examiner* — Tania Abraham
(74) *Attorney, Agent, or Firm* — Lorenz & Kopf LLP

(57) ABSTRACT

A vehicle seat with a modular vehicle seat frame is disclosed. The seat frame includes a first side module and a second side module which is arranged located opposite. A front, rear upper and middle cross brace are seat width-adaptably arranged between the side modules. Between the front and the rear cross brace a spring structure is stretched out, which spring-elastically supports a seat cushion of the vehicle seat.

5 Claims, 8 Drawing Sheets

(56) References Cited

U.S. PATENT DOCUMENTS

| | | | |
|---|---|---|---|
| 5,918,943 A * | 7/1999 | Mitschelen | B60N 2/68 297/362.11 |
| 6,079,783 A * | 6/2000 | Schuster, Sr. | B60N 2/66 297/284.1 |
| 7,631,939 B2 | 12/2009 | Wulf et al. | |
| 7,651,166 B2 | 1/2010 | Schwingenschloegel et al. | |
| 8,128,147 B1 * | 3/2012 | Kanda | B60N 2/0232 296/65.05 |
| 8,240,762 B2 | 8/2012 | Herzberg | |
| 8,590,976 B2 | 11/2013 | Davis | |
| 2007/0145807 A1 * | 6/2007 | Gundall | B60N 2/062 297/452.18 |
| 2012/0049597 A1 * | 3/2012 | Brewer | B60N 2/0232 297/313 |
| 2012/0062007 A1 * | 3/2012 | Telesco | B60N 2/4221 297/313 |
| 2012/0261963 A1 * | 10/2012 | Heyer | B60N 2/0232 297/313 |
| 2013/0009435 A1 | 1/2013 | Westerink et al. | |
| 2013/0076098 A1 * | 3/2013 | Neterer | B60N 2/68 297/452.18 |

FOREIGN PATENT DOCUMENTS

| | | |
|---|---|---|
| DE | 102005060446 A1 | 6/2007 |
| DE | 102006058703 A1 | 6/2008 |
| DE | 102007007296 A1 | 8/2008 |
| DE | 102007049752 A1 | 9/2008 |
| DE | 102007049067 B3 | 1/2009 |
| DE | 102007052960 A1 | 5/2009 |
| DE | 102008063404 A1 | 2/2010 |
| DE | 102008037434 A1 | 4/2010 |
| DE | 102009006753 A1 | 8/2010 |
| DE | 102010021743 A1 | 12/2011 |
| FR | 2899160 A1 | 10/2007 |
| GB | 899560 A | 6/1962 |
| KR | 20120091664 A | 8/2012 |

* cited by examiner

VEHICLE SEAT WITH A MODULAR FRAME

CROSS REFERENCE TO RELATED APPLICATION

This application claims priority to German Patent Application No. 102013015357.3 filed Sep. 14, 2013, which is incorporated herein by reference in its entirety.

TECHNICAL FIELD

The technical field relates to a vehicle seat with a modular vehicle seat frame, and more particularly to a modular seat frame having a first side module and a second side module arranged located opposite the first side module.

BACKGROUND

The vehicle seat disclosed in DE 10 2006 014 421 A1, includes a vehicle seat frame which can be adapted to different vehicle types. In particular, the base of the seat frame is variable in width in that the vehicle seat on both vehicle seat sides has a uniform structure, and the two sides are connected through transverse connectors, which are selectable regarding their fastening possibilities or their dimensions, if appropriate are deflectable as required or selectable from a set of parts of different lengths. In addition to this, the publication discloses the attachment of automatically adjustable seat position kinematics, with which a seat shell supported by a seat frame, which includes upholstery, is adjustable in height.

SUMMARY

In accordance with the present disclosure a vehicle seat with a modular vehicle seat frame is provide, in which the vehicle seat frame can be employed independently of different vehicle types, so that the development costs for each seat shell to be newly developed for receiving different seat cushions of individual different vehicle types are reduced.

An embodiment of the present disclosure relates, with a first aspect, to a modular vehicle seat frame. The vehicle seat frame includes a first side module and a second side module which is arranged located opposite. The side modules each include lateral backrest spars, which are connected to one another via a first and a second side module joint.

A front cross brace connects the front ends of the seat spars which are adjustable in height. A rear cross brace connects the rear lower ends of the seat spars. An upper cross brace connects the upper ends of the backrest spars in an upper backrest region. A backrest shell, which can be fixed to the backrest spars, covers a rearward area of a back cushion. A middle cross brace, which is arranged between the side module joints, connects the side modules to one another in the region of the side module joints.

The cross braces of the vehicle seat frame are adaptable to the seat width, i.e. their lengths are initially significantly greater than the width of the vehicle seat and can be adapted to the width of the different vehicle seats. In addition to this, the vehicle seat frame includes a spring structure, which spring-elastically supports a seat cushion of the vehicle seat and which is stretched out between the front and the rear cross brace of the modular vehicle seat frame.

With this spring structure it is possible to omit rigid pre-fabricated seat shells which drive up costs. In addition, the spring structure can be stretched out and arranged between the rear cross brace and the front cross brace in such a manner that it permits a seat width adaptation, without the spring structure having to be adapted or changed in any way. A further advantage of such a spring structure is that with its spring-back characteristic or its spring constants, the seat can be adapted to the weight of the respective passenger or driver of a vehicle. To this end, a spring structure of the same type can be stretched open between the front and the rear transverse braces, however with individually adapted spring-elastic characteristics of spring element cross sections.

In a further embodiment of the present disclosure it is provided to realize the side modules, the seat spars, the backrest spars and the cross braces out of profiled roll plates. This has the advantage that the modules, spars and cross braces can be uniformly produced in mass production for a multitude of vehicle modules and thereby significantly reduce the costs of a vehicle fleet of a manufacturer and increase the profit margins.

A further embodiment is provided that is based on the modular seat frame the cross braces and include profiled roll plates which can be cut in length to the seat width or backrest width. Thus, it is advantageously achieved that initially a multitude of uniform cross braces having oversized can be produced from profiled roll plates and cutting in length to the end dimension of the seat width can only take place shortly before using the cross braces for connecting the side modules.

It is provided furthermore that the cross braces are connected to the side modules via welded connections. These are advantageous both for metal sections as well as for plastic sections, since the welding process can be cost-effectively employed and carried out by robots.

Alternatively, the cross braces may be connected to the side modules via rivet connections, wherein overlap regions between side modules and ends of the cross braces can be provided in order to cost-effectively produce rivet connections with production robots.

Furthermore, the cross braces can be connected to the side modules via screw connections, wherein overlap regions between side modules and ends of the cross braces can be provided in order to cost-effectively produce rivet connections with production robots. In the case of screw and rivet connections, a greater assembly effort compared with welded connections must be expected, since corresponding drilled holes have to be provided in the overlap regions.

Most favorable with respect to the assembly effort and cost expenditure is to provide connecting via self-locking plug connections. Although this requires a greater development effort, this can however have a positive effect on the lowering of costs in mass production later on.

In a further embodiment of the present disclosure it is provided that the upper cross brace includes two hollow sections pieces which are arranged parallel to one another, which are fixed on the upper cross brace at a right angle to the latter for the height-adjustable mounting of a headrest frame. This has the advantage that a safe shock load to be transmitted via the headrests can be absorbed by the vehicle seat and in particular by the modular vehicle seat construction and transmitted into the vehicle structure.

A further embodiment of the present disclosure provides that the seat spars of the side modules are pivotably arranged about a joint relative to a base structure of the vehicle seat which is connected to the vehicle floor and the cross braces thus have front ends which are adjustable in height, which can be pivoted about the joint. These height-adjustable ends of the seat spars are transversely connected via the front cross brace. Such a structure has the advantage that the seat region of a vehicle seat, for example for taking load off thighs and knees, is height-adjustable in a simple and cost-effective manner in that the front height-adjustable ends are either manually adjusted to different setting angles with respect to the joints or an automatic adjustability of the front cross brace is ensured with the help of electric servomotors, so that the front height-adjustable ends can be oriented at different setting angles in order to adapt the height of a front seat cushion edge to the driver or to a vehicle occupant.

In addition to this it is provided that the side module joints of the side modules have kinematics with a tilt angle of a seat cushion relative to a backrest cushion between 30° and 180°. At 180° there is the practical possibility of converting the seat into a reclining seat while at 30° tilt angle entering a vehicle without rear door entrance is facilitated by tilting the backrest cushion relative to the seat cushions.

Going below the 30° tilt angle is not practical, since the backrest can then protrude over the front seat cushion edge of the seat cushion because of its length and thus render entering a vehicle without rear door entrance difficult. Apart from this, a smaller tilt angle than 30° between backrest spar and seat spar is not realistic because of the thickness of the upholstery, both of the seat cushion as well as of the backrest cushion.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
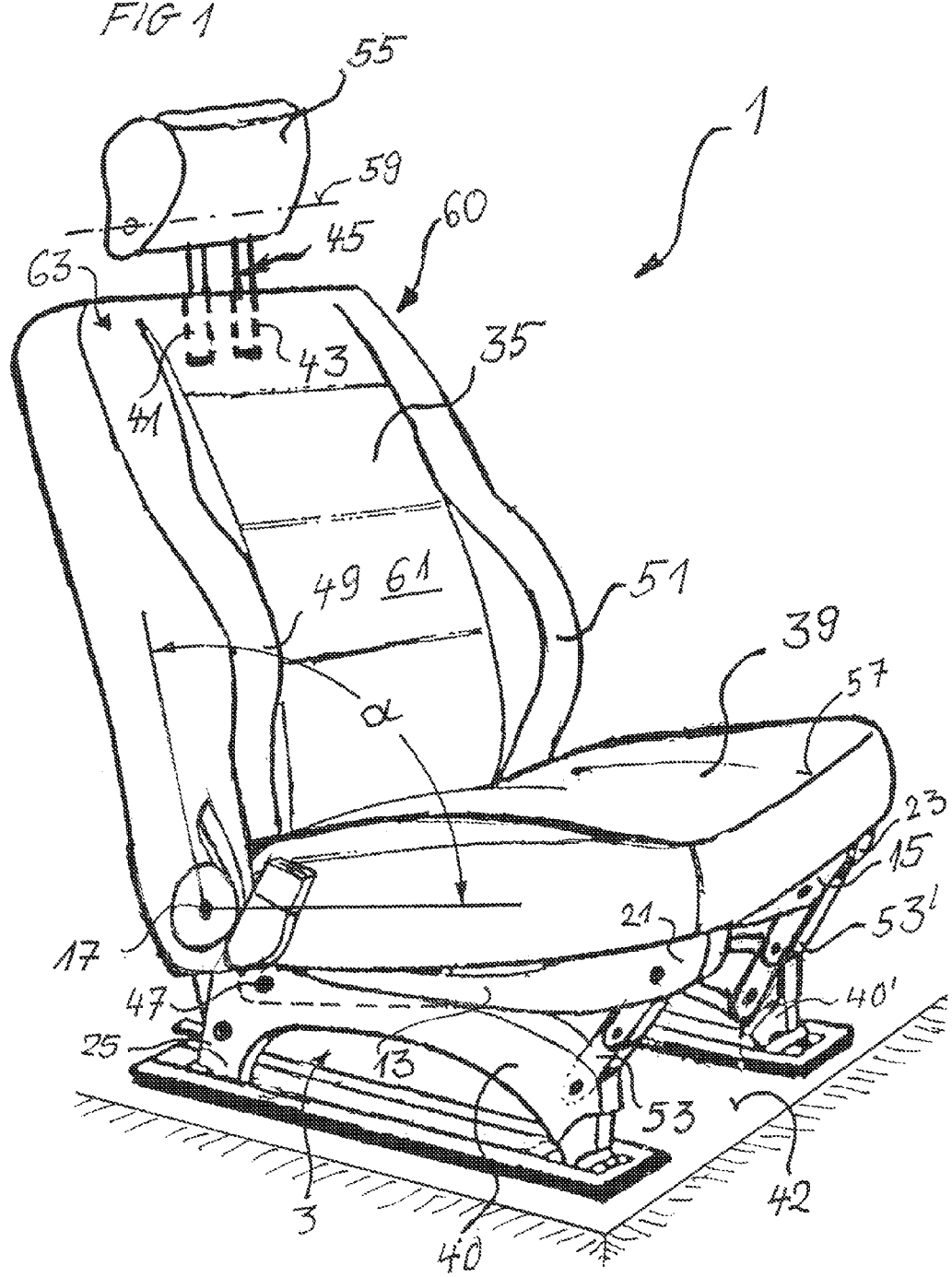
FIG. 1 shows a schematic perspective view of a vehicle seat.

FIG. 1 shows a schematic perspective view of a vehicle seat 1. The vehicle seat 1 substantially includes a seat cushion 39 and a backrest cushion 35, which are pivotable about a side module joint 17 and in the position shown in FIG. 1 assume a tilt angle α, which can be varied between almost 180° and 30°. Here, the small tilt angles up to 30° are intended for slightly tilting the backrest in order to extremely tilt the backrest 60 in vehicles without rear doors and thus make possible passengers entering the rear region of the vehicle. A tilt angle up to 180° is advantageous in order to reconstitute such a vehicle seat 1 into a reclining seat.

The seat cushion 39 and the backrest cushion 35 are held in position through a vehicle seat frame 3, which is only partially visible in FIG. 1. The vehicle seat frame 3 includes a first and a second side module, which are explained in more detail in the following figures. Of the vehicle seat frame 3, merely the structure below the seat cushion 39 is partially visible in FIG. 1. The first side module includes a first base structure 40, on which at a rear end 25 a first seat spar 13 is pivotably arranged about a joint 47.

The first seat spar 13 and a second seat spar 15 located opposite laterally support the seat cushion 39, the front edge 57 of which is adjustable in height relative to a vehicle floor 42. To this end, the front edge 57 of the seat cushion 39 is supported by a front cross brace which is not visible here, which is arranged between a first height-adjustable end 21 of the first seat spar 13 and a second height-adjustable end 23 of the second seat spar 15. The first height-adjustable end 21 is connected to the first base structure 40 via first height adjusting kinematics 53, while the second height-adjustable end 23 is connected to the second base structure 40' of the second side module via second height adjusting kinematics 53'.

In an upper region 63 of the backrest cushion 35, a headrest frame 45 is height-adjustably arranged in a first hollow sections piece 47 and a second hollow sections piece 43. The hollow sections pieces 41 and 43 are marked with dashed lines in FIG. 1, more so since they are arranged within the upper region 63 of the backrest cushion 35 in such a manner that the headrest 55 with the frame 45 can be height-adjustably pushed into the hollow sections pieces 41 and 43. In addition to this it is also possible to pivot the headrest 55 about a pivot axis 59 into a suitable support position for the head of a driver or of a passenger.

In order to increase the safety of the driver or passenger on the vehicle seat 1, the backrest cushion 35 has a first side rest reinforcement 49 and a second side rest reinforcement 51, wherein in this middle region 61 of the backrest cushion 35 a curvature is adjustable arranged in addition. The curvature in the middle region 61 of the backrest cushion 35 can thus be additionally adapted for taking load off a spine of a driver or passenger.

Figure 2:
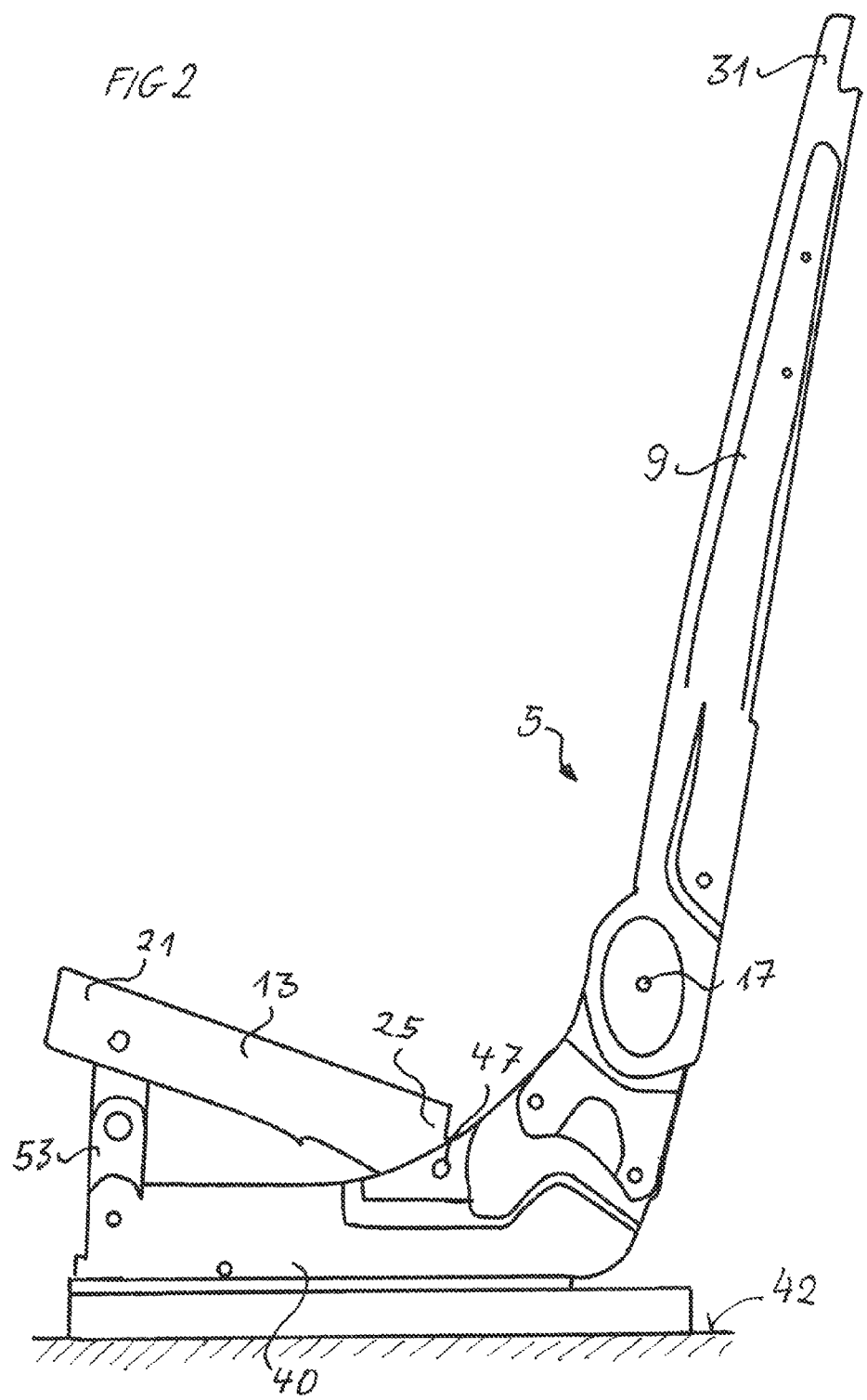
FIG. 2 shows a schematic lateral view of a side module of a vehicle seat from for a vehicle seat according to FIG. 1.

FIG. 2 shows a schematic lateral view of a first side module 5 of a vehicle seat frame for a vehicle seat 1 according to FIG. 1. This first side module 5 shown here is almost identical in design with a second side module located opposite, which is shown in the following figures. The first side module 5 includes a backrest spar 9, which is formed of a profiled roll sheet and pivotably connected to the first base structure 40 of this first side module 5 via a side module joint 17. A further pivot mechanism is provided for a first seat spar 13 with a joint 47 on a rear end 25 of the seat spar 13 and a front end 21, which is connected to the first base structure via first height adjusting kinematics 53.

Figure 3:
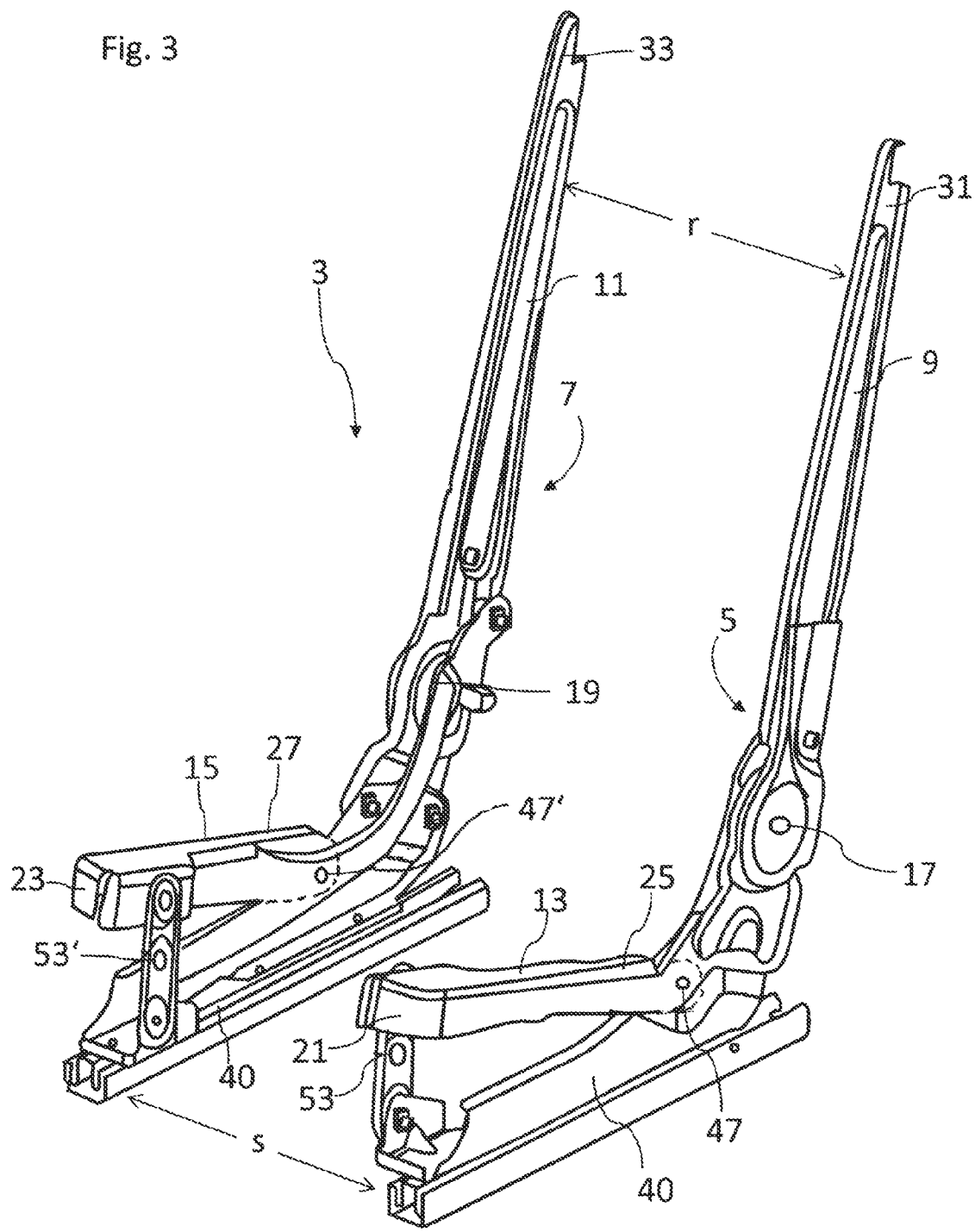
FIG. 3 shows schematic perspective views of a first and second side module of a vehicle seat frame.

FIG. 3 shows schematic perspective views of a first side module 5 and of a second side module 7 of a vehicle seat frame 3. These first and second side modules 5 and 7 can be employed for a wide range of vehicle widths, so that a multitude of vehicle models with vehicle seats of different widths can be equipped with these side modules 5 and 7. In addition, both the seat width s as well as the backrest width r can be adapted to the respective vehicle seat width.

The backrest width r in this case is obtained as a distance between the first back spar 9 of the first side module 5 and the second back spar 11 of the second side module 7, wherein the final backrest width is determined by the backrest cushion, as shown in FIG. 1. The seat width s in this case is shown as distance between the first base structure 40 of the first side module 5 and of the second base structure 40' of the second side module 7, wherein the final seat width is determined by the seat cushion as shown in FIG. 1.

To support this seat cushion, the first and the second side module 5 and 7 respectively include a first seat spar 13 of the first side module 5 and a second seat spar 15 of the second side module 7, which are pivotable about the joints 47 and 47' of the first and of the second side module 5 and 7 respectively, so that the front ends 21 and 23 respectively of the seat spars 13 and 15 respectively are height adjustable with the help of the height adjusting kinematics 53 and 53' respectively relative to a vehicle floor which is not shown here.

Figure 4:
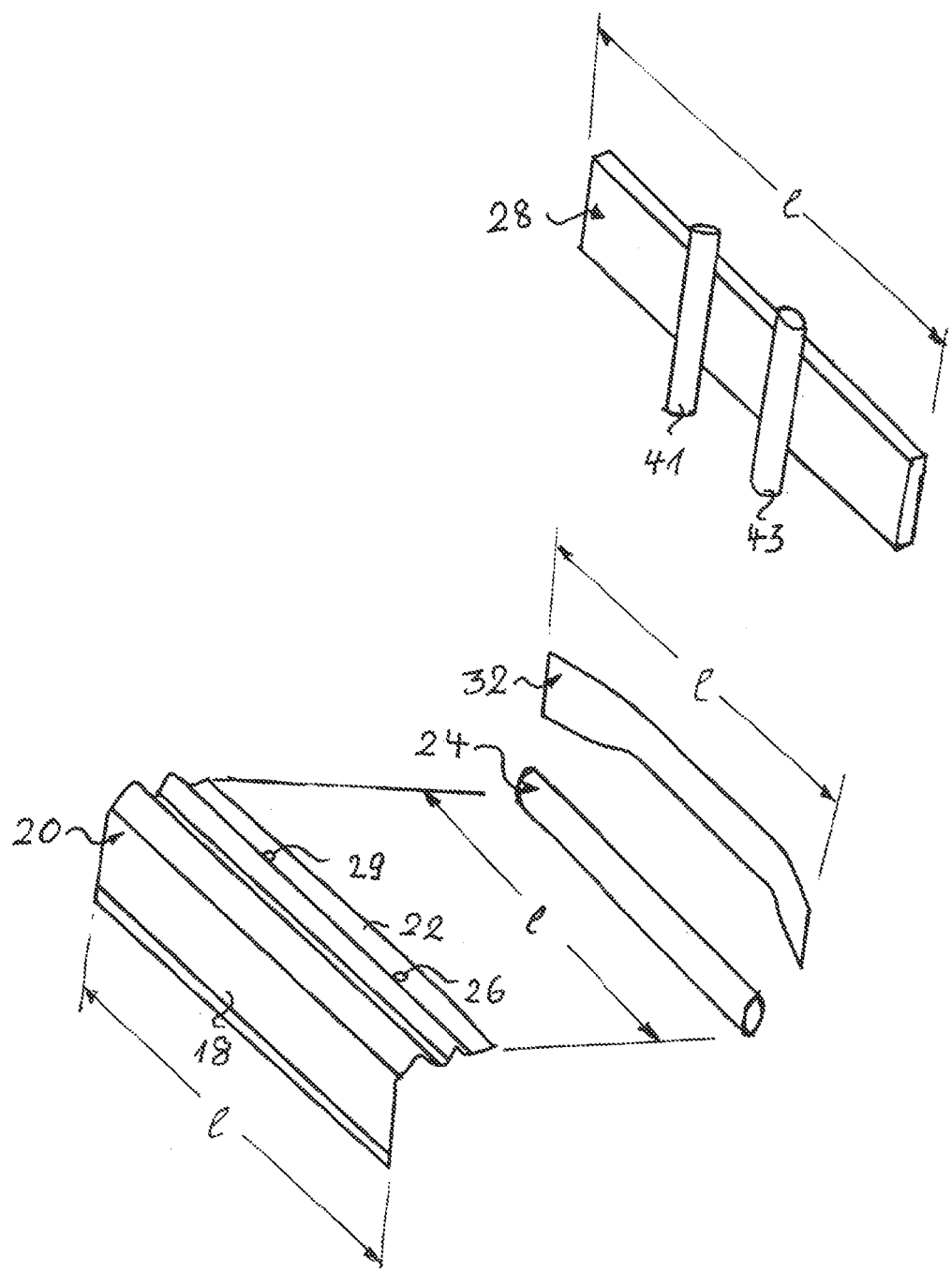
FIG. 4 shows schematic perspective views of a front, a rear, an upper and a middle cross brace of a vehicle seat frame for a vehicle seat according to FIG. 1.

FIG. 4 shows schematic perspective views of a front cross brace 20, a rear cross brace 24, an upper cross brace 28 and a middle cross brace 32 of a vehicle seat frame for a vehicle seat according to FIG. 1. For this purpose, the cross braces can be again produced from a profile roll plate. In the case of the front cross brace 20, the sheet is folded approximately at a right angle with a lower perpendicularly arranged leg 18 and an almost horizontal upper leg 22, having elongated stabilizing grooves.

In addition, at least one hole 26, 29 is provided in the front cross brace into which a spring structure for the spring-elastic supporting of the seat cushion can be hooked. The length 1 of the front cross brace is adapted to the seat width s shown in FIG. 3. A rear cross brace 24 of profile roll plate can initially have an oversize length and is cut in length to an adapted length 1 for the respective vehicle seat. Furthermore, a middle cross brace 32 is provided FIG. 4, which is arranged in the region of the side module joints 17 and 19, as they are shown in FIG. 3, in order to secure and stabilize the spacing between the two side modules 5 and 7.

Furthermore, FIG. 4 shows an upper cross brace 28, which is likewise cut in length to a length 1, adapted to the width of the vehicle seat and which additionally includes two hollow section pieces 41 and 43 which are spaced from one another, which are fixed to the upper cross brace 28 at a right angle to the latter. The hollow section pieces 41 and 43 with their hollow cross section are adapted to a corresponding headrest frame 45, which is shown in FIG. 1.

Following the attachment of the cross braces 20, 24, 28 and 32 shown in FIG. 4 between the two side modules 5 and 7, as are shown in FIG. 3, the vehicle seat frame can be assembled in a stable and sturdy manner of two side modules and these for cross braces.

Figure 5:
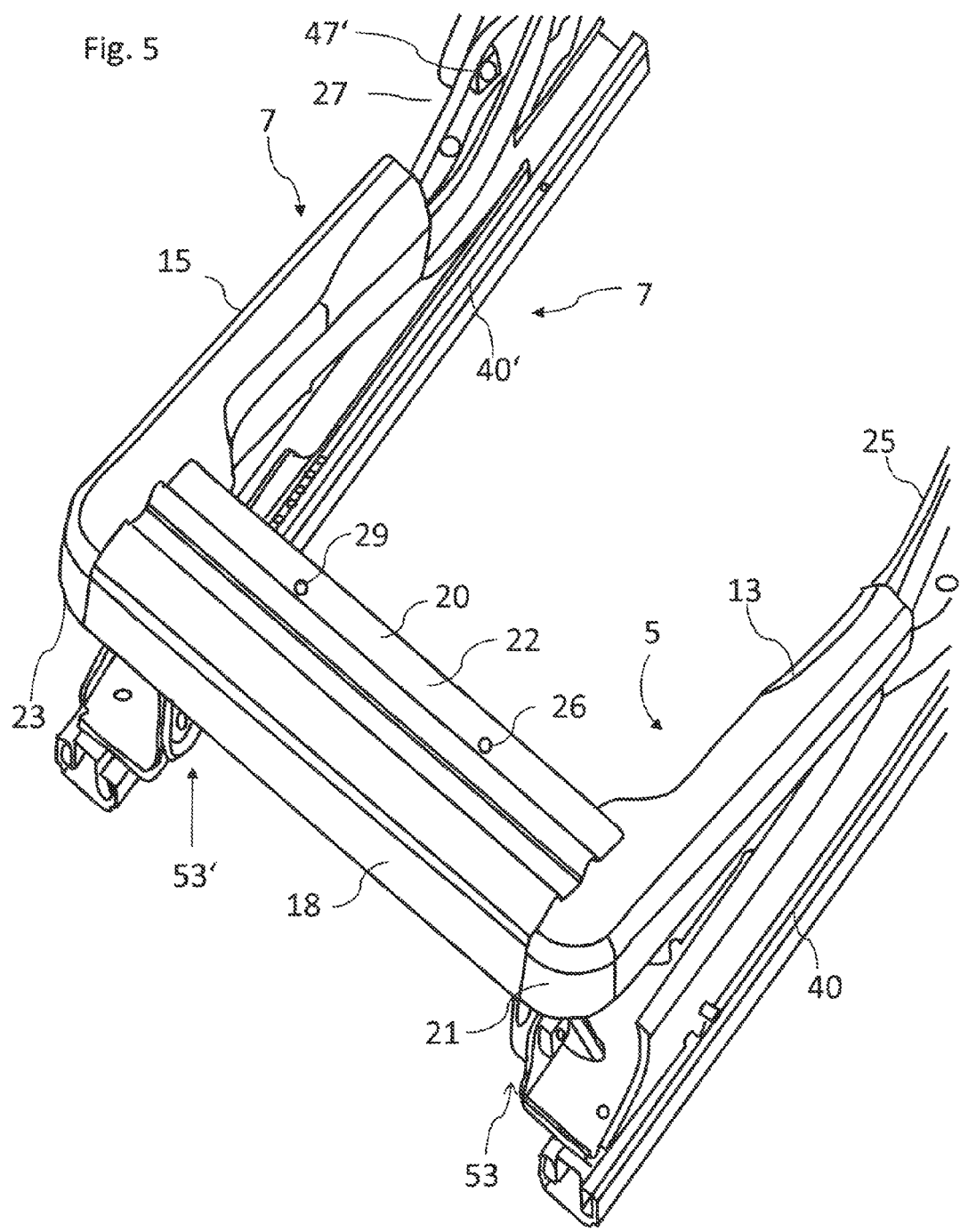
FIG. 5 shows a schematic perspective view of the first and second side module in the region of front ends of seat spars with mounted front cross brace.

FIG. 5 shows a schematic perspective view of the first and second side module 5 and 7 respectively in the region of front ends 21 and 23 respectively of seat spars 13 and 15 respectively with mounted cross brace 20. Both the height adjusting kinematics 53 of the first side module 5 as well as the height adjusting kinematics 53' of the second side module 7 are almost entirely covered by the front cross brace 20 in this view. This front cross brace 20 is welded in a materially joined manner to a first end 25 of the front seat spar 13 and on the opposite side in a materially joined manner through a weld seam to the second end 23 of the second seat spar 15. The second pivot joint 47', about which the seat spars 13 and 15 can be pivoted for the height adjustment of the front cross brace 20 is merely evident by the second pivot joint 47'. In addition, FIG. 5 clearly shows the holes 26 and 29 for hooking a spring structure into the front cross brace 20.

Figure 6:
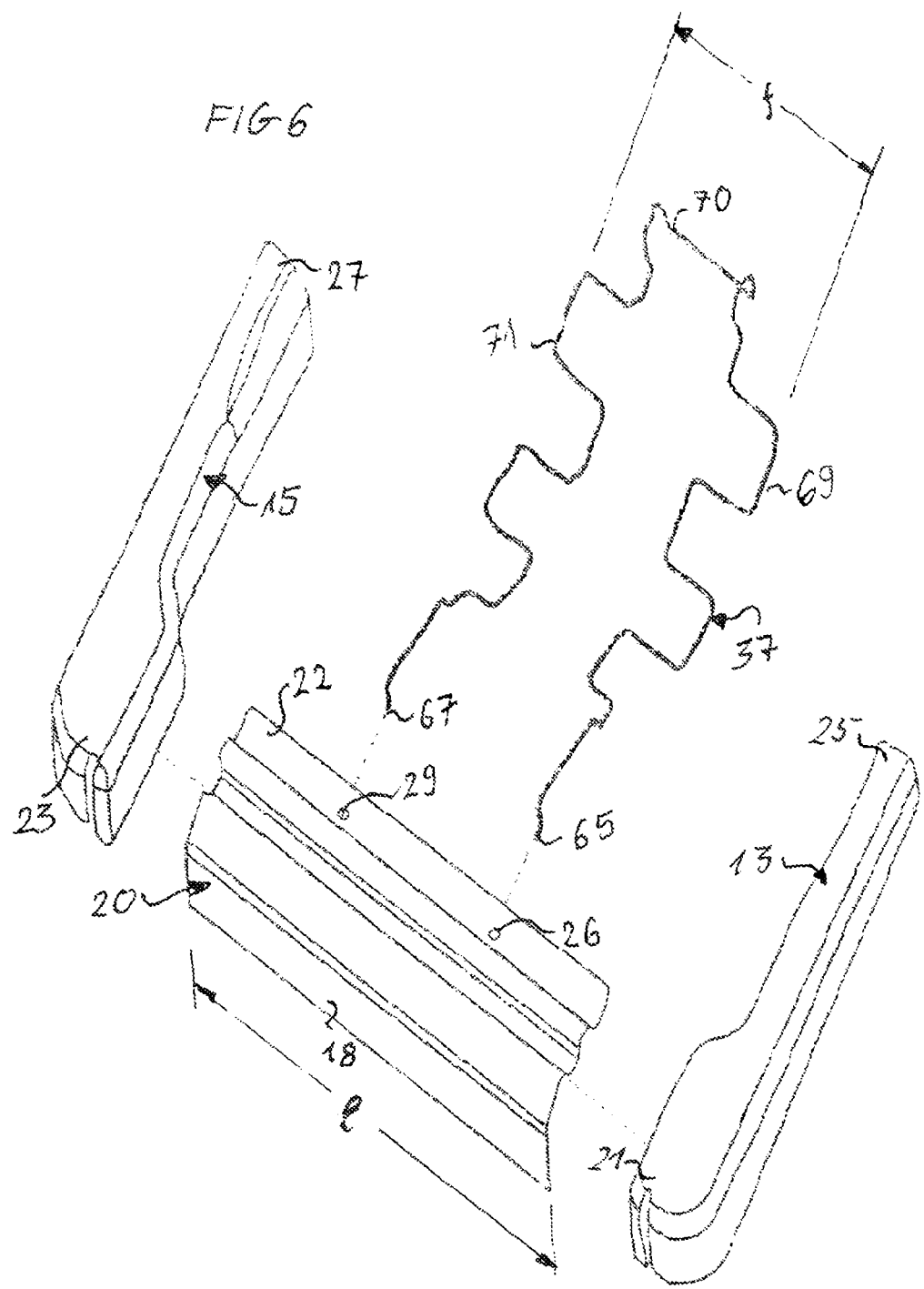
FIG. 6 shows a schematic perspective expanded view of the first and second seat spar with front cross brace and spring structure.

FIG. 6 shows a schematic perspective expanded view of the first seat spar 13 and of the second seat spar 15 with the front cross brace 20 and a spring structure 37. While the front cross brace 20 and the first seat spar 13 and the second seat spar 15 have the same shapes in FIG. 6 as are already known from FIG. 5, FIG. 6 now additionally shows details of the spring structure 37.

The spring structure 37 includes a spring steel or spring bronze wire which is bent U-like and includes a first leg 69 and a second leg 71, which are connected to one another via a connecting bend 70. The connecting bend 70 is shaped in such a manner that it can be hooked in on the rear cross brace. The front ends 65 and 67 respectively of the first leg 69 and of the second leg 71 can be hooked into the holes 26 and 29 provided in the cross brace 20.

In addition, the legs 69 and 71 are meander-like in order to cover a spring width f of this spring structure bent U-like, wherein however this spring width f is provided smaller than the smallest provided seat width s of the vehicle frame structures in order to be able to cover a multitude of different seat widths with one and the same spring structure without changing the spring structure.

Figure 7:
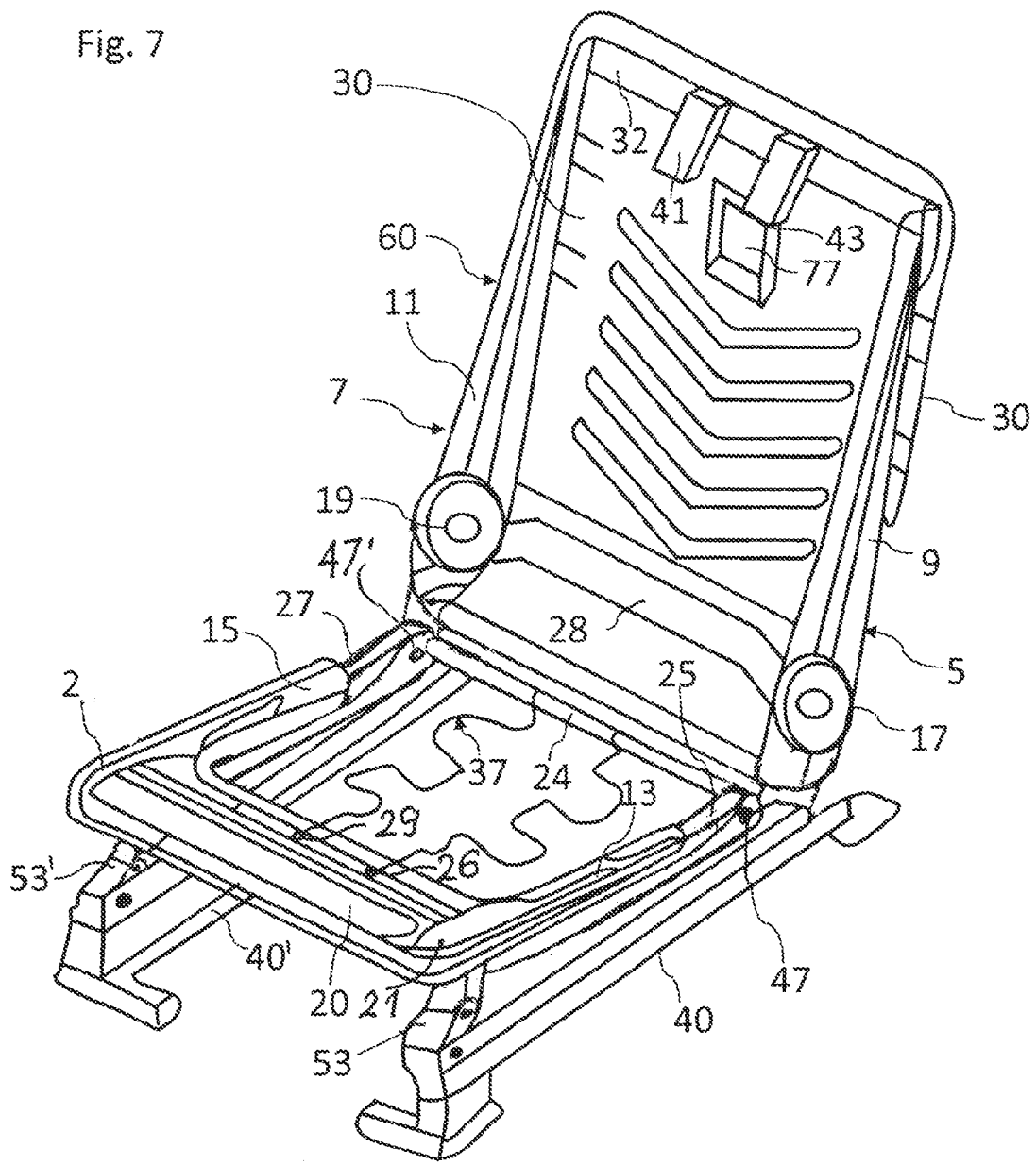
FIG. 7 shows a schematic perspective view of an assembled vehicle seat frame.

FIG. 7 shows a schematic perspective view of an assembled vehicle seat frame 3 with side modules 5 and 7, which include base structures 40 and 40' and the cross braces 20, 24, 28 and 32. While the seat area is supported by the spring structure 37, a backrest shell 30 is fixed on the backrest 60, which can include plastic or natural fiber materials or cellulose. In the backrest shell 30 an opening 77 is provided, which can receive for example an ashtray.

Components with same functions as disclosed above are marked with same reference characters and not explained separately.

Figure 8:
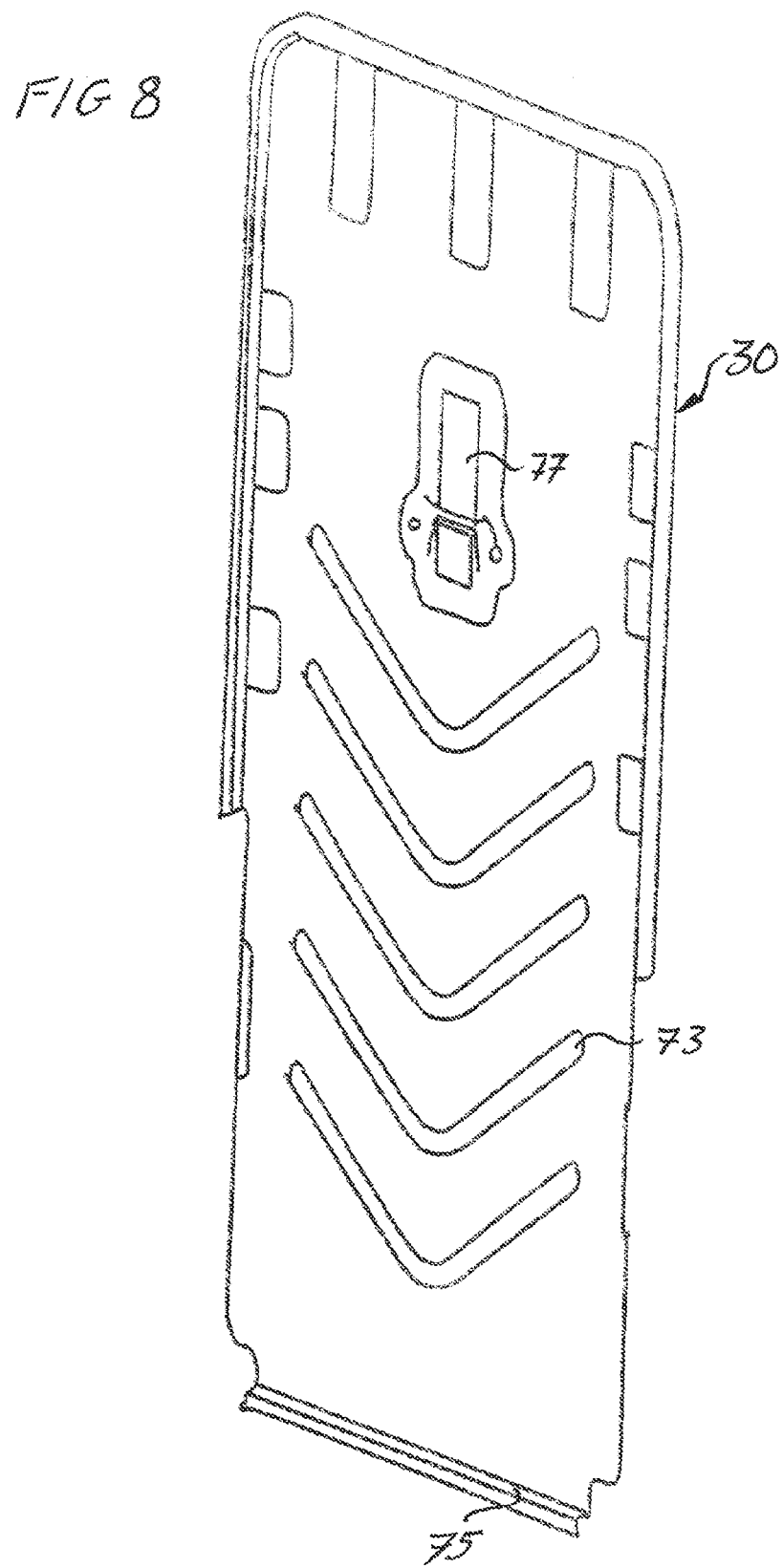
FIG. 8 shows a schematic perspective view of a backrest shell.

FIG. 8 shows a schematic perspective view of a backrest shell 30. The backrest shell 30 includes reinforcing ribs 73 and the opening 77 for receiving for example an ashtray already shown in FIG. 7. In addition to this, the lower edge 75 of the backrest shell 30 is shaped in such a manner that it can be clipped onto the rear cross brace.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A vehicle seat with a modular vehicle seat frame comprising:
   a first side module having a first lateral backrest spar and a first lateral seat spar interconnected to the first lateral backrest spar at a first side module joint;
   a second side module arranged opposite the first side module, the second side module having a second lateral backrest spar and a second lateral seat spar interconnected to the second lateral backrest spar at a second side module joint;
   a backrest shell fixedly secured on the first and second lateral backrest spars and covering a rearward area of a backrest cushion; and a cross brace assembly include:

a front cross brace transversely connecting a front height-adjustable end on each of the first and second lateral seat spars, the front cross brace having a middle region disposed approximately half way between the first and second lateral seat spars, the front cross brace also including a first hole and a second hole disposed on opposite sides of the middle region;

a rear cross brace transversely connecting a rear lower end on each of the first and second lateral seat spars;

an upper cross brace transversely connecting an upper end on each of the first and second side modules in an upper backrest region;

a middle cross brace transversely connecting the first and second side modules in the region of the first and second side module joints; and a spring structure extending between the front cross brace and the rear cross brace configured to spring-elastically support a seat cushion of the vehicle seat;

wherein the cross brace assembly is seat width adaptable;

wherein the cross braces are connected to the side modules with self-locking plug connections; and wherein cross braces comprise profiled roll plates which are configured to be cut in length to the seat width or backrest width; and wherein the spring structure is a one-piece structure having a first end that is received in the first hole, a second end that is received in the second hole, and a body that extends continuously between the first and second ends; and wherein the spring structure has a width that is smaller than a predetermined smallest width of the vehicle seat.

2. The vehicle seat according to claim 1, wherein the first and second side modules seat spars, backrest spars and cross braces comprise of roll plates.

3. The vehicle seat according to claim 1, wherein the upper cross brace comprises two hollow section pieces arranged parallel to one another and fixed at a right angle to the upper cross brace for the height-adjustable receiving of a headrest frame.

4. The vehicle seat according to claim 1, wherein the seat spars of the side modules are pivotably arranged about a joint with respect to a base structure of the vehicle seat which is connected to the vehicle floor, the joint comprising front height-adjustable ends which are transversely connected to the front cross brace.

5. The vehicle seat according to claim 1, wherein the side module joints of the side modules have kinematics which comprise a tilt angle of a seat cushion with respect to a backrest cushion between 30° and 180°.

* * * * *